(12) United States Patent
Kaminski et al.

(10) Patent No.: US 6,845,624 B2
(45) Date of Patent: Jan. 25, 2005

(54) PROCESS FOR CHILLING ANIMAL CARCASSES

(75) Inventors: Robert T. Kaminski, West St. Paul (CA); Dan A. Lenton, Brandon (CA)

(73) Assignee: Maple Leaf Foods Inc., Manitoba (CA)

( * ) Notice: Subject to any disclaimer, the term of this patent is extended or adjusted under 35 U.S.C. 154(b) by 0 days.

(21) Appl. No.: 10/424,298

(22) Filed: Apr. 28, 2003

(65) Prior Publication Data

US 2004/0211194 A1 Oct. 28, 2004

(51) Int. Cl.⁷ .......................... F25D 17/02; F25D 25/00
(52) U.S. Cl. .............................. 62/64; 62/375; 62/378
(58) Field of Search .......................... 62/64, 375, 378, 62/63, 65, 380

(56) References Cited

U.S. PATENT DOCUMENTS

| | | | |
|---|---|---|---|
| 2,989,401 A | * 6/1961 | Anderson ................... 426/68 |
| 4,028,774 A | 6/1977 | Allan | |
| 4,325,221 A | 4/1982 | Grewar | |
| 4,810,515 A | 3/1989 | Bourdel | |
| 4,940,599 A | 7/1990 | Engler | |
| 6,481,220 B2 | * 11/2002 | Butler ........................ 62/64 |
| 6,550,267 B2 | 4/2003 | Maxwell | |
| 2003/0037563 A1 | * 2/2003 | Maxwell et al. .............. 62/375 |

* cited by examiner

*Primary Examiner*—William C. Doerrler
(74) *Attorney, Agent, or Firm*—Woodling, Krost and Rust

(57) ABSTRACT

A process of cooling animal carcasses from a kill temperature to a temperature at which deterioration is substantially prevented comprises circulation of refrigerated air over the carcass to freeze an outer of the carcass, followed by application of water to the carcass to form a sufficiently continuous layer of ice on the carcass. Preferably, the carcass is chilled by a multi-stage quick chill process in which the carcass is exposed to super-cooled, high velocity air. Immediately before or immediately after formation of the ice layer, the carcass is transferred to a refrigerated chamber to allow the interior and exterior of the carcass to equilibrate to the temperature at which deterioration is substantially prevented. The inventors have found that this process provides reduced moisture loss and reduced bacterial loading over prior art processes in which water is applied to the carcass during the quick chill process.

18 Claims, No Drawings

PROCESS FOR CHILLING ANIMAL CARCASSES

FIELD OF THE INVENTION

This invention relates generally to processing of carcasses and more particularly to a process for chilling of carcasses to prevent deterioration and moisture loss.

BACKGROUND OF THE INVENTION

Following the slaughter of animals for meat, it is necessary to immediately chill the carcasses of the freshly killed animals from the kill temperature to a temperature at which deterioration of the meat is substantially prevented.

One problem encountered during the chilling process is a loss of moisture from the carcasses. As well as causing undesirable condensation on the walls and ceiling of the chill room, moisture loss results in a significant reduction in the end weight of the carcass, up to about three percent, and a corresponding reduction in profit. Loss of moisture also negatively impacts the quality of the end product, particularly in the appearance of the outer portions of the carcass from which most of the moisture is lost.

The problem of moisture loss has been addressed by subjecting the carcasses to rapid chilling by super-cooled, high velocity air. This type of rapid chilling process is known in the art as "quick chill" or "blast chill". One such process is described in U.S. Pat. No. 4,028,774 (Allan et al.) issued Jun. 14, 1977, and involves passing a carcass through a specially designed enclosure in which it is chilled by circulation of refrigerated air. As described in the Allen et al. patent, the quick chill process causes the formation of a thin frozen crust on the outer surface of the carcass, thus preventing deterioration of the inner portions of the carcass as it is cooled, and also reducing the moisture loss from the carcass to a relatively low level.

Although the cooling achieved by the quick chill process is relatively rapid, the quick chill process requires a significant period of time to achieve the required temperature reduction and to form a thin frozen crust on the outer surface of the carcass. For example, quick chilling of hog carcasses typically requires about one to two hours.

Based on the belief that there is appreciable loss of carcass weight early in the quick chill process, some have attempted to further reduce moisture loss by freezing the outermost layer of a carcass as rapidly as possible. One such process is described in U.S. Pat. No. 4,325,221 (Grewar) issued Apr. 20, 1982. Grewar discloses rapidly freezing the outermost layer of flesh on a carcass by contacting the carcass with a cryogenic liquid such as liquid nitrogen or liquid carbon dioxide, followed by cooling the carcass throughout by placing it in a mechanically refrigerated cold room under non-thawing conditions.

A similar process is described in U.S. Pat. No. 4,940,599 (Engler et al.), issued Jul. 10, 1990. Engler et al. discloses a process in which carcasses are rapidly chilled by being subjected to a supercold atmosphere, such as a cryogenic fluid, for a brief period of time. According to Engler et al., this results in supercooling of the outermost layer of flesh without the occurrence of crust-freezing. Either immediately before or immediately after the quick chilling of the carcasses, they are sprayed with a fine mist of water, thereby forming a thin ice layer on the outer surface of the carcasses. Once the ice layer is formed, the carcasses are passed into a refrigeration chamber for further cooling.

An improved process for minimizing moisture loss during the chilling process is described in U.S. Pat. No. 6,550,267 (Maxwell et al.), issued on Apr. 22, 2003, and incorporated herein by reference in its entirety. Maxwell et al. discloses a process in which carcasses are sprayed with water early in the quick chill process, preferably at a stage at which the temperature of the outer surface of the carcass is close to 0° C., but before freezing of the outermost layer of flesh occurs. The water freezes to form a protective layer of ice on the carcass. The carcass then continues through the remainder of the quick chill process before entering a refrigeration chamber where cooling is continued and the ice layer is allowed to melt.

Despite the fact that some of the processes described above may provide benefits in terms of reduced moisture loss and improved appearance and quality of the meat product, each of these processes has some disadvantages which limit its usefulness. Therefore, there is a continued need for a chilling process which will further reduce moisture loss and improve product appearance and quality.

SUMMARY OF THE INVENTION

The present invention overcomes the above-described problems of the prior art by providing a process for chilling a carcass in which an outer surface layer of a carcass is first frozen, after which the carcass is encased in a layer of ice. Preferably, water is applied to the carcass at the end of a quick chill process, and immediately before or immediately after passing the carcass into a refrigeration chamber.

Controlled experiments have shown that most of the moisture loss occurs in the refrigeration chamber and not during the quick chill process, as previously believed. Therefore, encasing the carcass in a protective layer of ice before or during the quick chill process achieves only a limited reduction in moisture loss, for at least two reasons. Firstly, the high air flow rate within the quick chill chamber causes some of the water to be blown from the carcass before it can freeze. Secondly, the extreme cold temperatures and high air flow rate of the quick chill have a substantial drying effect, resulting in depletion of the ice layer by sublimation. By the time the carcass leaves the quick chill environment and enters the refrigeration chamber, most of the ice layer is gone, and significant amounts of moisture are able to escape the carcass as it is chilled in the refrigeration chamber.

Controlled experiments have also shown that application of the ice layer after freezing of the outer surface layer of the carcass results in reduced bacteria levels as compared to processes in which the ice layer is applied before or during the quick chill process. The inventors have found that there is no net increase or decrease in bacteria loading as compared to a conventional quick chill process in which the carcasses are not sprayed with water. At present, the inventors are unable to explain this observation.

In one aspect, the present invention provides a process for cooling an animal carcass from a kill temperature to a temperature at which deterioration of the carcass is substantially prevented, the carcass having an outer surface layer and an interior, the process comprising: (a) circulating refrigerated air over the carcass, the air having a temperature and a flow rate such that the outer surface layer of the carcass becomes frozen; and (b) applying water to the carcass, wherein the water freezes after contacting the frozen outer surface layer, thereby forming a substantially continuous layer of ice on the carcass.

In a preferred aspect, the process of the present invention further comprises the step of: (c) continuing to cool the carcass at a temperature and a time sufficient such that the interior and the outer surface of the carcass equilibrate to the temperature at which deterioration is substantially prevented. Preferably, water is applied to the carcass immediately before or at the beginning of step (c).

In another preferred aspect of the present invention, the temperature at which deterioration is substantially prevented is greater than 0° C. and up to about 5° C., such that the interior and the outer layer of the carcass are in a fresh, unfrozen state after completion of step (c).

In yet another preferred aspect of the present invention, step (a) comprises a quick chill process, the quick chill process including at least one cooling stage in which the outer surface layer of the carcass is cooled by circulation of air having a temperature about −10 to A0° C. Preferably, the duration of the quick chill process is from about 100 to about 120 minutes and comprises a multi-stage process. More preferably, the quick chill process comprises the following: (i) moving the carcass through a first area in which the temperature is in the range of about −10 to −40° C. and the air flow rate is up to about 4,000 c.f.m., preferably about 3,500 to 4,000 c.f.m.; (ii) moving the carcass through a second area in which the temperature is in the range of about −10° C. to −30° C. and the air flow rate is up to about 4,000 c.f.m., preferably about 3,000 to 3,500 c.f.m.; and (iii) moving the carcass through a third area in which the temperature is in the range of about −5 to −20° C., preferably −10 to −20° C., and the air flow rate is up to about 4,000 c.f.m., preferably about 2900 c.f.m.

In yet another preferred aspect of the present invention, step (b) of the process is conducted in a fourth area in which the temperature is at or above 0° C. Preferably, the rate of air circulation in the fourth area is sufficiently low to substantially avoid formation of gaps in the ice layer.

In yet another preferred aspect of the present invention, step (c) of the process is conducted in a fifth area in which the temperature is about 0 to about 5° C. It may also be preferred to conduct step (b) in the fifth area.

In yet another preferred aspect of the present invention, water is applied to the carcass by spraying. Preferably, the water being applied to the carcass has a temperature of up to about 3° C., and preferably a sufficient amount of water is applied to the carcass such that the layer of ice remains on the carcass for at least about 4 hours during step (c).

DETAILED DESCRIPTION OF PREFERRED EMBODIMENTS

A preferred process for chilling animal carcasses is now described below. Although the preferred process is described with specific reference to the chilling of a hog carcass, it will be appreciated that the process of the present invention can be applied to a variety of other species, including beef, sheep and poultry. Furthermore, although the process is described with reference to a single animal carcass, it will be appreciated that the process of the invention is preferably used for continuous, large scale processing of animal carcasses, and can be used in facilities where hundreds or thousands of carcasses are processed on a daily basis.

Immediately following the slaughter of an animal, its carcass is conveyed on a gambrel to a preparation room for initial preparation prior to chilling. Initial preparation preferably includes washing the carcass with water and cutting the carcass open to remove body organs and expose the interior body cavity. During initial preparation, the carcass is at a "kill temperature" which is between ambient room temperature and the body temperature of the animal prior to slaughter.

After slaughter and initial preparation, the carcass is exposed to a supercold environment in which refrigerated air is circulated over the carcass, the air having a temperature and a flow rate such that an outer surface layer of the carcass becomes frozen. As used herein, the term "outer surface" refers to those surfaces of the carcass, including surfaces of the interior cavity, which are in direct contact with chilled air in the refrigeration chamber. The term "outer surface layer" refers to the outermost layer of the carcass, which includes the outer surface and the first few millimeters of the carcass directly underlying the outer surface, and which is cooled to below 0° C. to form a frozen crust during exposure of the carcass to the supercold environment. The term "interior" as used herein refers to those portions of the carcass which are enclosed by the outer surface layer and which remain in an unfrozen state during, and preferably after, exposure of the carcass to the supercold environment.

As mentioned above, the supercold environment preferably comprises a "quick chill" process, which preferably includes at least one cooling stage in which the carcass is cooled by circulation of supercold air having a temperature of from about −10° C. to about −40° C. For the chilling of hog carcasses, the duration of the quick chill process is preferably from about 100 to about 120 minutes. Preferably, the quick chill process comprises a multi-stage process, and more preferably comprises the following:

Stage 1: Moving the carcass through a first area in which the temperature is in the range of from about −10 to about −40° C. and the air flow rate is up to about 4000 c.f.m.;

Stage 2: Moving the carcass through a second area in which the temperature is in the range of from about −10° C. to about −30° C. and the air flow rate is up to about 4000 c.f.m.; and Stage 3: Moving the carcass through a third area in which the temperature is in the range of from about −5 to about −20° C. and the air flow rate is up to about 4000 c.f.m.

Preferably, the cooling conditions are most aggressive in the first stage of the quick chill process, in which the surface temperature of the carcass is rapidly lowered to prevent cell damage and deterioration. The cooling conditions progressively become milder as the carcass moves through the second and third stages. The milder conditions of the second stage allow heat to be removed from the carcass while preventing it from being "shocked", and the even milder conditions of the third stage allow the carcass to recover from the effects of the supercold environment prior to transfer to the refrigeration chamber.

More preferred temperature and air flow rate conditions for the quick chill process are as follows:

Stage 1: temperature from about −10° C. to about −30° C.; air flow rate from about 3500 to about 4000 c.f.m.;

Stage 2: temperature from about −10 to about −30° C.; air flow rate from about 3000 to about 3500 c.f.m.; and Stage 3: temperature from about −10° C. to about −20° C.; air flow rate of about 2900 c.f.m.

In a particularly preferred quick chill process according to the invention, the temperature in the first stage is from about −25 to about −30° C., the temperature in the second stage is from about −15° C. to about −20° C. and the temperature in the third stage is from about −10° C. to about −15° C. The duration of the first stage may preferably be from about 25 to about 30 minutes, the second stage is about 60 minutes in duration and the third stage is about 10 to 15 minutes in duration.

Although preferred temperature and air flow rate conditions are described above, it will be appreciated that there may be other combinations of temperature and air flow rate, or temperature alone, which may be able to produce the desired chilling of the carcass.

At the end of the quick chill process, the temperature of the outer surface layer of the carcass is below 0° C., such that the outer surface layer is in the form of a frozen crust. The interior of the carcass, however, is at a temperature above 0° C. and is therefore in a fresh state. For hog carcasses, the temperature of the interior, after the third stage of the quick chill process, is typically from about 10° C. to about 15° C.

Immediately following the quick chill process, water is applied to the carcass and freezes upon contacting the frozen outer surface layer, thereby forming a substantially continuous layer of ice on the carcass. As mentioned above, the ice layer protects the carcass from losing moisture as it undergoes one or more further cooling steps.

There are several possible methods by which water can be applied to the carcass. For example, the carcass could be dipped or submerged in water, or the water can be applied by misting or spraying. Preferably, the water is sprayed from one or more spray heads, which may be of various sizes and/or spray patterns. The carcass may, for example, be sprayed with water by conveying it through one or more spray booths of the type described in the Maxwell et al. publication mentioned above. However, the temperature in the area in which the carcass is sprayed is preferably maintained at or slightly above 0° C., and therefore the spray cabinet may not require heating means to prevent freezing of the water. Furthermore, it will be appreciated that it is not necessary to enclose the spray heads in a spray cabinet, although it may be preferred to enclose the spray heads in a cabinet to reduce condensation of water in the area in which the carcass is sprayed.

The area in which the carcass is sprayed (the "spray area") may be located between the quick chill chamber and the refrigeration chamber, and may preferably comprise a hallway or passageway between the quick chill chamber and the refrigeration chamber. Alternatively, the spray area may be located at an entrance to the refrigeration chamber, or inside the refrigeration chamber. Due to the relatively large difference in temperature between the spray area and the quick chill chamber, an air curtain is preferably provided between these two areas.

The residence time of the carcass in the spray area is preferably not greater than about one minute. Preferably, water is applied to the carcass immediately after it passes through the air curtain separating the quick chill chamber from the spray area, or immediately inside the refrigeration chamber, and the frozen glaze of ice forms on the carcass within seconds. During application of water to the carcass, and preferably for about one minute afterwards, the air flow rate is minimized, with the rate of air circulation being sufficiently low to substantially avoid formation of gaps in the ice layer. Excessive air circulation during application of the ice layer would result in much of the water being blown off the carcass and/or the formation of bare spots on the carcass. It will be appreciated that the rate of air circulation inside the refrigeration chamber is sufficiently low to avoid formation of gaps in the ice layer.

The water applied to the carcass may be obtained from a municipal water supply, and is preferably temperature-controlled. The inventors have found that the temperature of the water sprayed onto the carcass is very important. Water which is too warm will not be cooled sufficiently by contact with the frozen outer surface of the carcass, and will run off the carcass without becoming frozen. Preferably, the temperature of the water which is applied to the carcass is not greater than about 3° C. The amount of water applied to the carcass is sufficient that the ice shell is continuous and does not leave any exposed areas which would result in moisture loss during subsequent cooling of the carcass.

Under the conditions described above, a controlled, uniform shell of ice is quickly formed around the carcass. Immediately before or immediately after application of the ice layer, the carcass is preferably moved to a refrigeration chamber in which cooling is continued at a temperature and for a time sufficient that the interior and the outer surface layer of the carcass equilibrate to a temperature at which deterioration is substantially prevented. The temperature inside the refrigeration chamber, and the temperature at which deterioration is prevented, are preferably between about 0° C. and about 5° C., so that the carcass is in a fresh, unfrozen state. For example, the temperature in the refrigeration chamber may be about 2° C.

During equilibration of the temperature, the ice layer provides a heat transfer medium to remove heat from the interior of the carcass, and as a consequence is gradually melted. Preferably, the ice layer remains intact for a sufficient period of time to prevent substantial escape of moisture from the carcass, preferably for at least about 4 hours. After about 16 hours in the refrigeration chamber, the carcass has a substantially uniform temperature throughout, and is removed for final processing to produce a meat product.

The inventors have found that the amount of moisture lost during the process of the present invention is less than that for the process described in the applicant's U.S. Pat. No. 6,550,267 and is also less than that for quick chill processes in which no water is sprayed on the carcasses. Specifically, controlled tests conducted on hog carcasses showed that the level of moisture loss, also known as "shrink", is about 0.40% for the process of the present invention, about 0.49% for a process as described in U.S. Pat. No. 6,550,267, and about 0.73% for a quick chill process in which no water was sprayed on the carcasses.

Although the invention has been described in connection with certain preferred embodiments, it is not intended to be limited thereto. Rather, the invention includes all embodiments which may fall within the scope of the following claims.

What is claimed is:

1. A process for cooling an animal carcass from a kill temperature to a temperature at which deterioration of the carcass is substantially prevented, the carcass having an outer surface layer and an interior, the process comprising:
   (a) freezing the outer surface layer of the carcass by circulating refrigerated air over the carcass, the air having a temperature and a flow rate such that the outer surface layer of the carcass is cooled to below 0° C. to form a frozen crust;
   (b) applying water to the frozen crust of the carcass, wherein the water freezes upon contacting the frozen crust, thereby forming a substantially continuous layer of ice on the carcass.

2. The process of claim 1, further comprising the step of:
   (c) continuing to cool the carcass at a temperature and a time sufficient such that the interior and the outer surface of the carcass equilibrate to the temperature at which deterioration is substantially prevented.

3. The process of claim 2, wherein water is applied to the carcass immediately before or at the beginning of said step (c).

4. The process of claim 1, wherein the temperature at which deterioration is substantially prevented is greater than 0° C. and up to about 5° C., such that the interior and the outer layer of the carcass are in a fresh, unfrozen state after completion of said step (c).

5. The process of claim 1, wherein said step (a) comprises a quick chill process, the quick chill process including at least one cooling stage in which the outer surface layer of the carcass is cooled by circulation of air having a temperature about −10 to −40° C.

6. The process of claim 5, wherein a duration of the quick chill process is from about 100 to about 120 minutes.

7. The process of claim 5, wherein the quick chill process comprises a multi-stage process.

8. The process of claim 7, wherein the multi-stage quick chill process comprises the following:
  (i) moving the carcass through a first area in which the temperature is in the range of about −10 to −40° C. and the air flow rate is up to about 4,000 c.f.m.;
  (ii) moving the carcass through a second area in which the temperature is in the range of about −10° C. to −30° C. and the air flow rate is up to about 4,000 c.f.m.; and
  (iii) moving the carcass through a third area in which the temperature is in the range of about −5 to −20° C. and the air flow rate is up to about 4,000 c.f.m.

9. The process of claim 8, wherein the temperature in the first area is about −10° C. to −30° C. and the air flow rate is about 3,500 to 4,000 c.f.m.

10. The process of claim 8, wherein the temperature in the second area is about −10 to −30° C. and the air flow rate is about 3,000 to 3,500 c.f.m.

11. The process of claim 8, wherein the temperature in the third area is about −10 to −20° C. and the air flow rate is about 2900 c.f.m.

12. The process of claim 1, wherein said step (b) is conducted in a fourth area in which the temperature is at or above 0° C.

13. The process of claim 12, wherein a rate at which air is circulated in the fourth area is sufficiently low to substantially avoid formation of gaps in the ice layer.

14. The process of claim 2, wherein said step (c) is conducted in a fifth area in which the temperature is about 0 to about 5° C.

15. The process of claim 1, wherein the water is applied to the carcass by spraying.

16. The process of claim 1, wherein the water being applied to the carcass has a temperature of up to about 3° C.

17. The process of claim 2, wherein sufficient water is applied to the carcass such that the layer of ice remains on the carcass for at least about 4 hours during step (c).

18. The process of claim 14, wherein step (b) and step (c) are conducted in the fifth area.

* * * * *

UNITED STATES PATENT AND TRADEMARK OFFICE
CERTIFICATE OF CORRECTION

PATENT NO. : 6,845,624 B2
DATED : January 25, 2005
INVENTOR(S) : Robert T. Kaminski and Dan A. Lenton It is certified that error appears in the above-identified patent and that said Letters Patent is hereby corrected as shown below:

Column 3,
Line 15, after "about -10 to" delete "A0" and insert -- -40 --.

Signed and Sealed this

Twenty-sixth Day of April, 2005

JON W. DUDAS
*Director of the United States Patent and Trademark Office*